United States Patent
Rao

(10) Patent No.: US 10,685,493 B2
(45) Date of Patent: Jun. 16, 2020

(54) SYSTEMS AND METHODS FOR DELIVERING AUGMENTED REALITY CONTENT

(71) Applicant: Facebook, Inc., Menlo Park, CA (US)

(72) Inventor: Sridhar Rao, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/853,846

(22) Filed: Dec. 24, 2017

(65) Prior Publication Data

US 2019/0197780 A1     Jun. 27, 2019

(51) Int. Cl.
| | |
|---|---|
| *H04W 4/30* | (2018.01) |
| *G06T 19/00* | (2011.01) |
| *H04W 4/021* | (2018.01) |
| *H04W 8/20* | (2009.01) |
| *H04W 8/24* | (2009.01) |
| *H04L 29/08* | (2006.01) |
| *G06F 16/487* | (2019.01) |

(52) U.S. Cl.
CPC .......... *G06T 19/006* (2013.01); *G06F 16/487* (2019.01); *H04L 67/26* (2013.01); *H04W 4/021* (2013.01); *H04W 4/30* (2018.02); *H04W 8/20* (2013.01); *H04W 8/24* (2013.01)

(58) Field of Classification Search
None
See application file for complete search history.

(56) References Cited

U.S. PATENT DOCUMENTS

| | | | |
|---|---|---|---|
| 6,415,323 B1 | 7/2002 | McCanne et al. | |
| 6,785,704 B1 | 8/2004 | McCanne | |
| 6,901,445 B2 | 5/2005 | McCanne et al. | |
| 7,734,730 B2 | 6/2010 | McCanne | |

(Continued)

FOREIGN PATENT DOCUMENTS

| | | |
|---|---|---|
| CN | 107466482 A | 12/2017 |
| EP | 3 503 502 A1 | 6/2019 |

(Continued)

OTHER PUBLICATIONS

Joongheon Kim,1 Jae-Jin Lee,2 and Woojoo Lee3, Strategic Control of 60 GHz Millimeter-Wave High-Speed Wireless Links for Distributed Virtual Reality Platforms, Nov. 25, 2016, Hindawi.*

(Continued)

*Primary Examiner* — Gary Lafontant
(74) *Attorney, Agent, or Firm* — FisherBroyles, LLP

(57) ABSTRACT

The disclosed computer-implemented method may include (i) identifying, by a content delivery network, (a) a set of edge nodes that are managed by the content delivery network and that are distributed in a plurality of physical locations and (b) a set of augmented reality data, (ii) directing each edge node in the set of edge nodes to store a subset of the set of augmented reality data that is designated for use at a physical location that is serviced by the edge node, (iii) detecting a request from a mobile device for an item of augmented reality data, (iv) selecting a node within the set of edge nodes based at least in part on a proximity of the node to the mobile device, and (v) directing the node to send the item of augmented reality data to the mobile device. Various other methods, systems, and computer-readable media are also disclosed.

20 Claims, 9 Drawing Sheets

(56) References Cited

U.S. PATENT DOCUMENTS

| | | | |
|---|---|---|---|
| 8,264,505 B2 | 9/2012 | Bathiche et al. | |
| 8,817,756 B1* | 8/2014 | Hart | H04W 74/04 |
| | | | 370/337 |
| 9,691,073 B2 | 6/2017 | Tseng et al. | |
| 9,858,723 B2 | 1/2018 | Stroila | |
| 9,992,290 B2 | 6/2018 | Tseng et al. | |
| 2010/0312861 A1* | 12/2010 | Kolhi | H04L 67/28 |
| | | | 709/219 |
| 2012/0166433 A1 | 6/2012 | Tseng | |
| 2012/0306920 A1 | 12/2012 | Bathiche et al. | |
| 2013/0147837 A1 | 6/2013 | Stroila | |
| 2013/0179576 A1* | 7/2013 | Boldyrev | H04L 47/70 |
| | | | 709/226 |
| 2013/0185355 A1 | 7/2013 | Tseng et al. | |
| 2013/0231045 A1* | 9/2013 | Duerksen | H04W 84/18 |
| | | | 455/7 |
| 2014/0215051 A1* | 7/2014 | Schlack | H04L 43/0817 |
| | | | 709/224 |
| 2016/0127485 A1 | 5/2016 | Tseng et al. | |
| 2017/0345022 A1 | 11/2017 | Tseng et al. | |
| 2018/0082485 A1 | 3/2018 | Stroila | |
| 2018/0278685 A1* | 9/2018 | Tiwari | H04L 67/1097 |

FOREIGN PATENT DOCUMENTS

| | | | |
|---|---|---|---|
| WO | 2017/044761 A1 | 3/2017 | |
| WO | WO-2017044761 A1 * | 3/2017 | H04L 67/34 |
| WO | 2019/125504 A1 | 6/2019 | |

OTHER PUBLICATIONS

Introducing Facebook's new terrestrial connectivity systems—Terragraph and Project ARIES (https://code.facebook.com/posts/1072680049445290/introducing-facebook-s-new-terrestrial-connectivity-systems-terragraph-and-project-aries/) Apr. 13, 2016.

International Search Report and Written Opinion received for International Patent Application Serial No. PCT/US2017/069171 dated Sep. 21, 2018, 19 pages.

Extended European Search Report received for EP Patent Application Serial No. 18180864.3 dated Dec. 14, 2018, 7 pages.

Communication pursuant to Article 94(3) EPC received for EP Patent Application Serial No. 18180864.3 dated Apr. 6, 2020, 8 pages.

Yu et al., "Computation Offloading for Mobile Edge Computing: A Deep Learning Approach", IEEE 28th Annual International Symposium on Personal, Indoor, and Mobile Radio Communications (PIMRC), Oct. 8, 2017, 6 pages.

\* cited by examiner

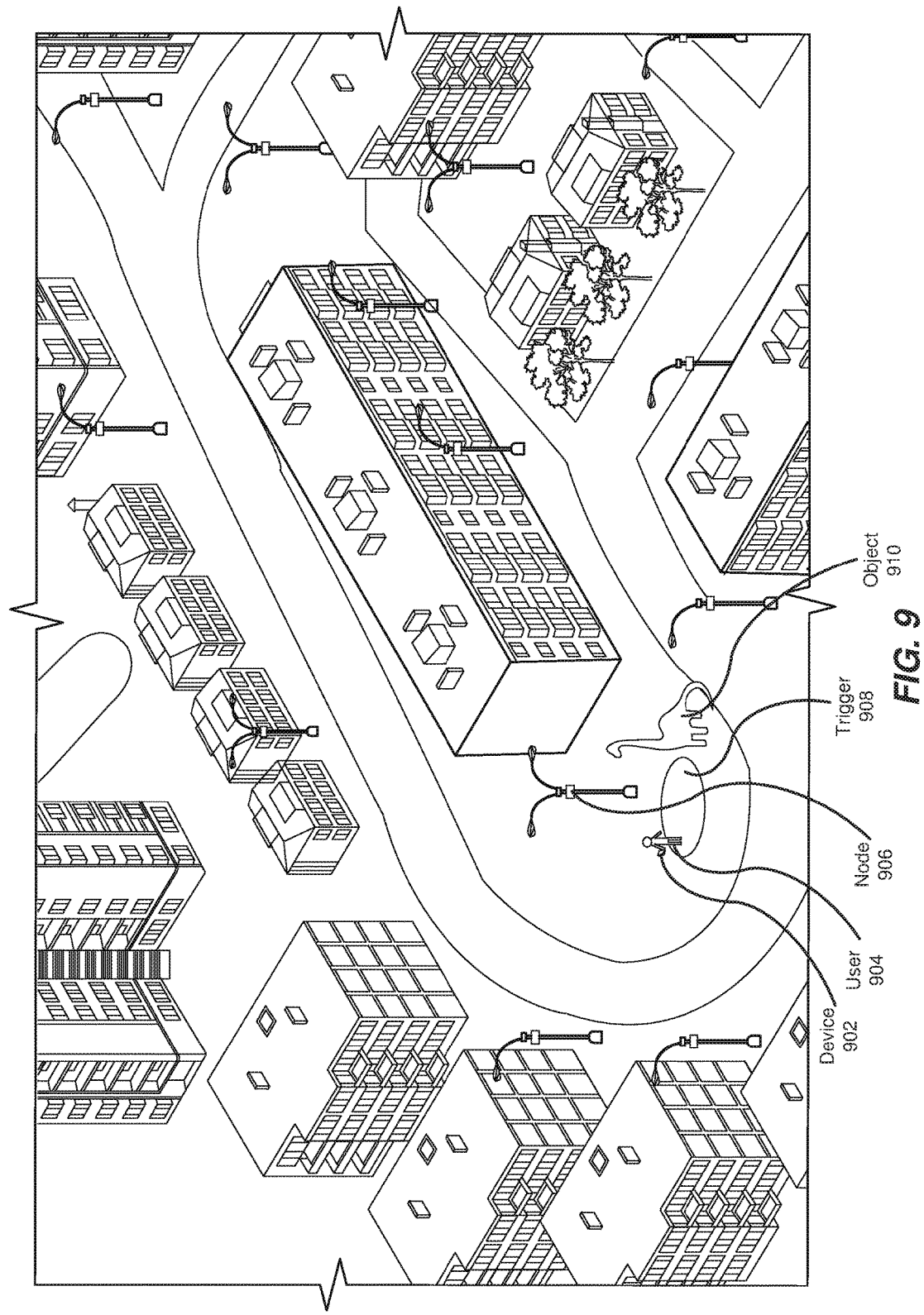

SYSTEMS AND METHODS FOR DELIVERING AUGMENTED REALITY CONTENT

BACKGROUND

Augmented reality systems that overlay virtual content onto the real world are becoming increasingly popular. A user looking through their phone's camera might see a monster, a baseball player, or a movie character overlaid onto the background of real-world objects and geographic features in the camera's range. Augmented reality systems display overlaid content in highly location-based ways, meaning that a user on one street corner may see a different virtual object than a user at a different street corner only a block away. While some of these virtual objects may be simple two-dimensional images or low-resolution three-dimensional objects, others may include high-resolution images or even videos. Delivering high-definition content seamlessly to mobile devices in a variety of locations may pose many challenges that are not adequately addressed by existing infrastructure and systems.

Traditional systems for delivering high-resolution content to mobile devices may suffer from high latency as large amounts of data move slowly through sprawling networks. High latency may be acceptable for some applications, but augmented reality applications may greatly benefit from virtual objects appearing quickly after a user interacts with a trigger in order to maintain verisimilitude or relevance. Accordingly, the instant disclosure identifies and addresses a need for additional and improved systems and methods for delivering augmented reality content.

SUMMARY

As will be described in greater detail below, the instant disclosure describes systems and methods for delivering augmented reality content with low latency by taking advantage of the highly location-specific nature of augmented reality content.

In one example, a computer-implemented method for delivering augmented reality content may include (i) identifying, by a content delivery network, (a) a set of edge nodes that are connected to and managed by the content delivery network and that are geographically distributed in a group of physical locations and (b) a set of augmented reality data for an augmented reality system, where different subsets of the set of augmented reality data are designated for use at different locations in the physical locations, (ii) directing, by the content delivery network, each edge node in the set of edge nodes to store a specified subset of the set of augmented reality data that is designated for use at a physical location within the physical locations that is serviced by the edge node, (iii) detecting, by the content delivery network, a request from a mobile device for an item of augmented reality data for the augmented reality system, (iv) selecting, by the content delivery network, a proximate node within the set of edge nodes based at least in part on a proximity of the proximate node to the mobile device, and (v) directing, by the content delivery network, the proximate node to send the item of augmented reality data to the mobile device.

In one embodiment, directing, by the content delivery network, each edge node in the set of edge nodes to store the specified subset of the set of augmented reality data that is designated for use at the physical location that is serviced by the edge node may include identifying a demographic of users that connect to the edge node and selecting the specified subset of the set of augmented reality data based at least in part on the demographic of users that connect to the edge node. In some examples, selecting the specified subset of the set of augmented reality data based at least in part on the demographic of users that connect to the edge node may include (i) identifying an augmented reality campaign, (ii) determining that the augmented reality campaign is targeted at the demographic of users that connect to the edge node that services the physical location, and (iii) selecting the specified subset of the set of augmented reality data that includes data designated for use at the physical location for the augmented reality campaign.

In one embodiment, detecting, by the content delivery network, the request from the mobile device for the item of augmented reality data for the augmented reality system may include receiving, at a portion of the content delivery network that is hosted on a server, the request from the mobile device. Additionally or alternatively, detecting, by the content delivery network, the request from the mobile device for the item of augmented reality data for the augmented reality system may include intercepting, by a device that is in proximity to the proximate node, the request from the mobile device and selecting, by the content delivery network, the proximate node within the set of edge nodes based at least in part on the proximity of the proximate node to the mobile device may include selecting the proximate node in response to the device that is in proximity to the proximate node intercepting the request. In one embodiment, directing, by the content delivery network, the proximate node to send the item of augmented reality data to the mobile device may include avoiding forwarding the request to a portion of the content delivery network hosted on a server by directing, by the portion of the content delivery network that is hosted on the device, the proximate node to send the item of augmented reality data to the mobile device.

In some examples, selecting, by the content delivery network, the proximate node within the set of edge nodes based at least in part on the proximity of the node to the mobile device may include selecting the proximate node in response to determining that the proximate node is in closest physical proximity to the mobile device compared to all other nodes within the set of edge nodes that are available to deliver the item of augmented reality data. Additionally or alternatively, selecting, by the content delivery network, the proximate node within the set of edge nodes based at least in part on the proximity of the proximate node to the mobile device may include selecting the proximate node based at least in part on network proximity of the proximate node to the mobile device.

In one embodiment, the set of edge nodes that are connected to and managed by the content delivery network and that are geographically distributed in the physical locations may be distributed such that each node within the set of edge nodes is within one thousand feet of at least one additional node within the set of edge nodes. In some embodiments, the edge node may be physically connected to a device that provides wireless network coverage for the physical location serviced by the edge node.

In one embodiment, directing, by the content delivery network, each edge node in the set of edge nodes to store the specified subset of the set of augmented reality data that is designated for use at the physical location within the physical locations that is serviced by the edge node may include applying a machine learning technique to determine a specified subset of augmented reality data that is expected to be requested by users serviced by the edge node. In some examples, directing, by the content delivery network, each edge node in the set of edge nodes to store the specified subset of the set of augmented reality data that is designated for use at the physical location within the physical locations that is serviced by the edge node may include correlating a map for the augmented reality system with the physical locations. In one embodiment, the item of augmented reality data may include high-definition visual data for display on the screen of the mobile device.

In one embodiment, a computer-implemented method for delivering augmented reality content, at least a portion of the method being performed by a computing device including at least one processor, may include (i) identifying a content delivery network that manages a set of edge nodes by directing each node in the set of edge nodes to store specified data from at least one augmented reality system in a cache that stores the specified augmented reality data locally on the node, (ii) receiving, at a node in the set of edge nodes, a request for an item of augmented reality data to be delivered to a mobile device in physical proximity to the node, (iii) retrieving, by the node, the item of augmented reality data from the cache that stores the augmented reality data locally on the node, and (iv) delivering, by the node, the item of augmented reality data to the mobile device.

In one embodiment, receiving, at the node in the set of edge nodes, the request for the item of augmented reality data to be delivered to the mobile device in physical proximity to the node may include receiving a request from the content delivery network to deliver the item of augmented reality data to the mobile device. Additionally or alternatively, receiving, at the node in the set of edge nodes, the request for the item of augmented reality data to be delivered to the mobile device in physical proximity to the node may include monitoring, by a device on the content delivery network in proximity to the node, network traffic originating from the mobile device and intercepting, by the device, the request for the item of augmented reality data from the mobile device.

In some examples, retrieving, by the node, the item of augmented reality data from the cache that stores the augmented reality data locally on the node may include (i) determining, by the node, that the item of augmented reality data is not stored in the cache on the node, (ii) requesting, by the node, the item of augmented reality data from the content delivery network, (iii) receiving, by the node, the item of augmented reality data from the content delivery network, and (iv) storing, by the node, the item of augmented reality data in the cache on the node.

In one embodiment, a system for implementing the above-described method may include several modules stored in memory, including (i) an identification module that identifies, by a content delivery network (a) a set of edge nodes that are connected to and managed by the content delivery network and that are geographically distributed in a group of physical locations and (b) a set of augmented reality data for an augmented reality system, where different subsets of the set of augmented reality data are designated for use at different locations in the physical locations, (ii) a storage direction module that directs, by the content delivery network, each edge node in the set of edge nodes to store a specified subset of the set of augmented reality data that is designated for use at a physical location within the physical locations that is serviced by the edge node, (iii) a detection module that detects, by the content delivery network, a request from a mobile device for an item of augmented reality data for the augmented reality system, (iv) a selection module that selects, by the content delivery network, a proximate node within the set of edge nodes based at least in part on a proximity of the proximate node to the mobile device, (v) a sending direction module that directs, by the content delivery network, the proximate node to send the item of augmented reality data to the mobile device, (vi) a receiving module that receives, at the proximate node, the request for the item of augmented reality data to be delivered to the mobile device in physical proximity to the proximate node, (vii) a retrieval module that retrieves, by the proximate node, the item of augmented reality data from a cache that stores the augmented reality data locally on the proximate node, (viii) a delivery module that delivers, by the proximate node, the item of augmented reality data to the mobile device and (ix) at least one physical processor that executes the identification module, the storage direction module, the detection module, the selection module, the sending direction module, the receiving module, the retrieval module, and the delivery module Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 9 is a diagram of an example set of nodes in context.

Figure 1:
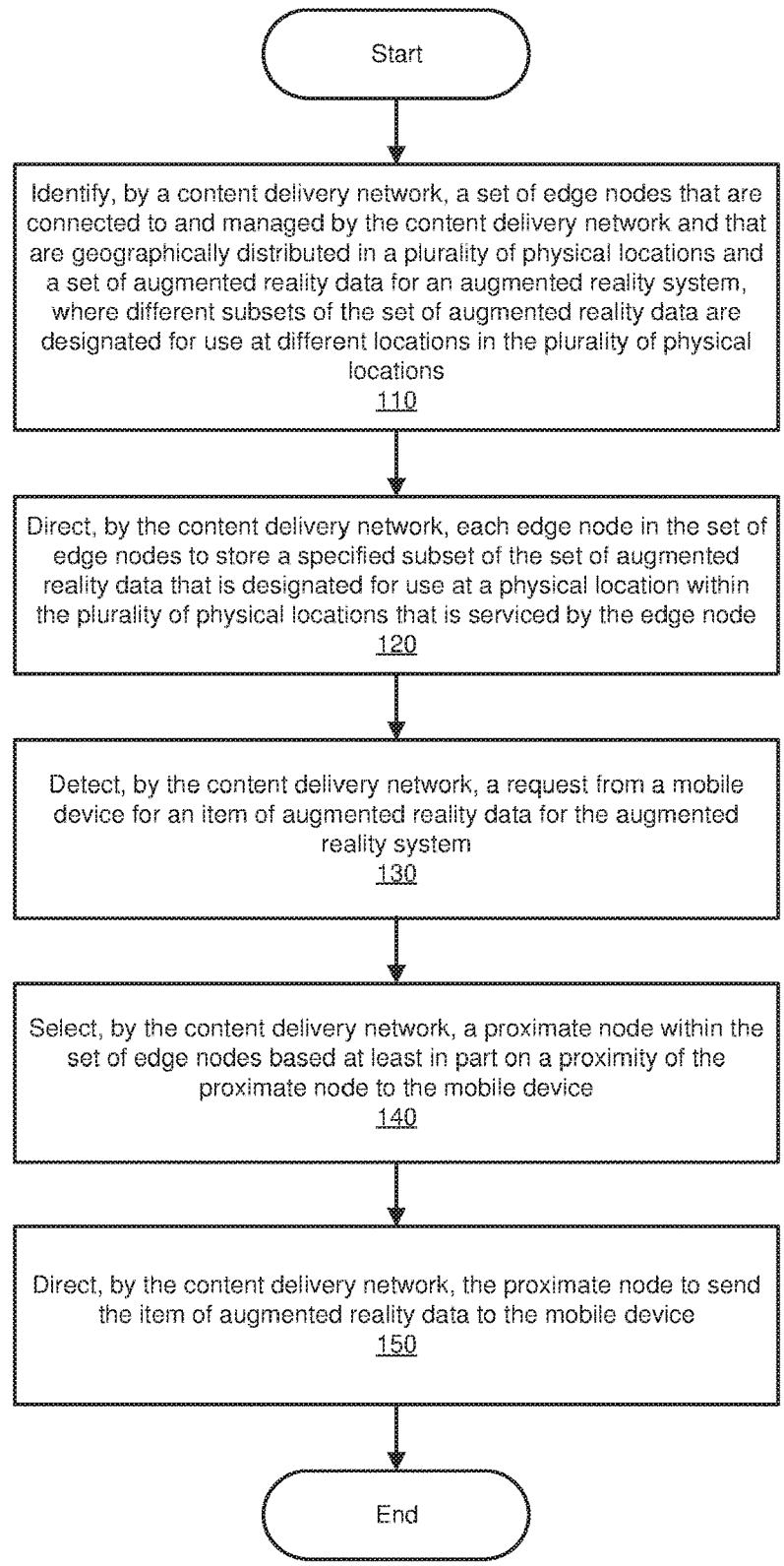
FIG. 1 is a flow diagram of an example method for delivering augmented reality content.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for delivering augmented reality content. As will be explained in greater detail below, by storing data on densely-packed edge nodes that service small, hyperlocal geographic areas based on what data is most likely to be requested by the users within each area, the systems and methods described herein may be able to reduce the latency of responses to requests for resource-intensive augmented reality data and/or improve the efficiency of network usage. In addition, the systems and methods described herein may improve the functioning of a computing device by delivering data to the computing device more quickly and efficiently. These systems and methods may also improve the field of content distribution networks by improving the way augmented reality data is distributed throughout and by content distribution networks.

Figure 5:
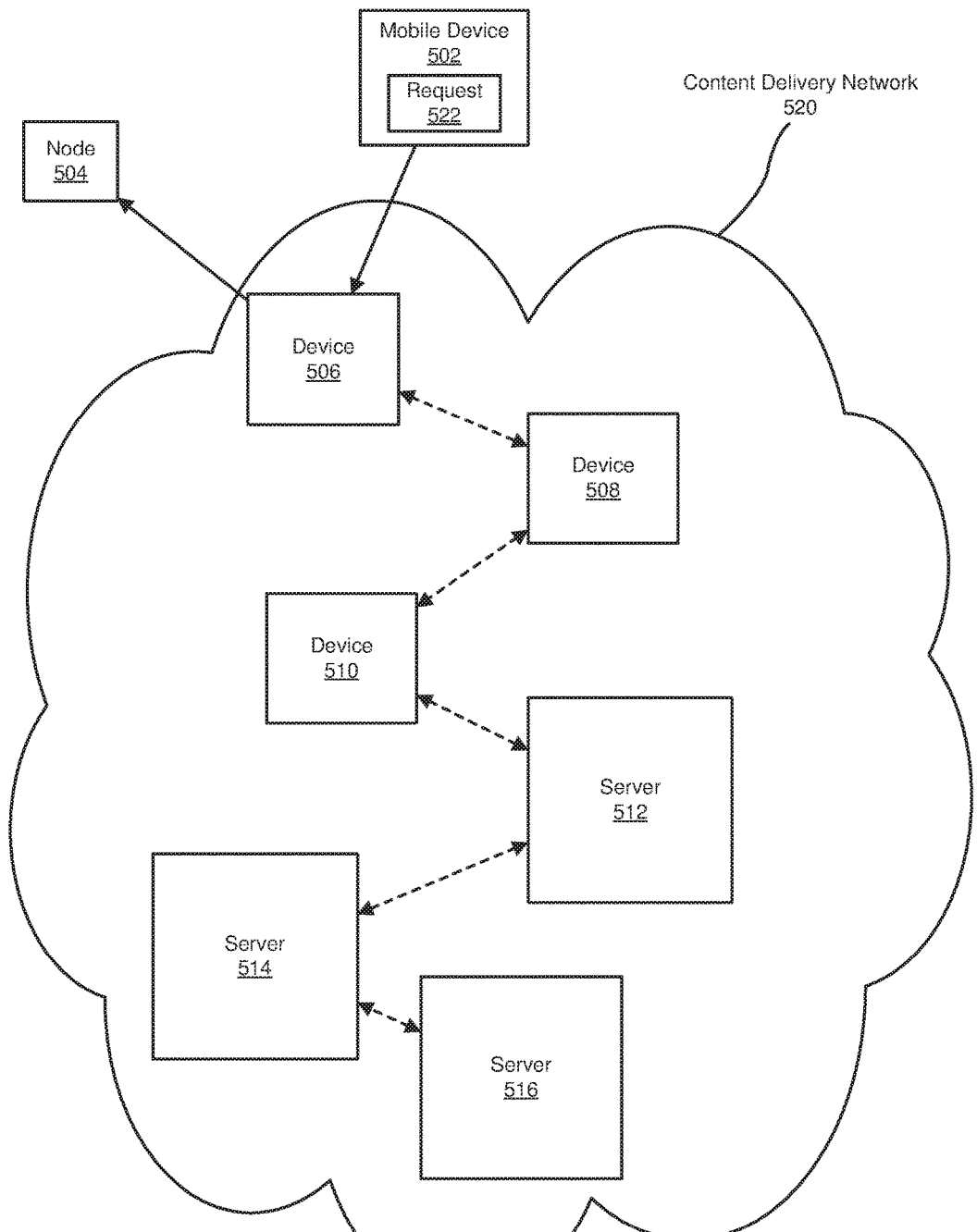
FIG. 5 is a block diagram of an example computing system for delivering augmented reality content.
Figure 6:
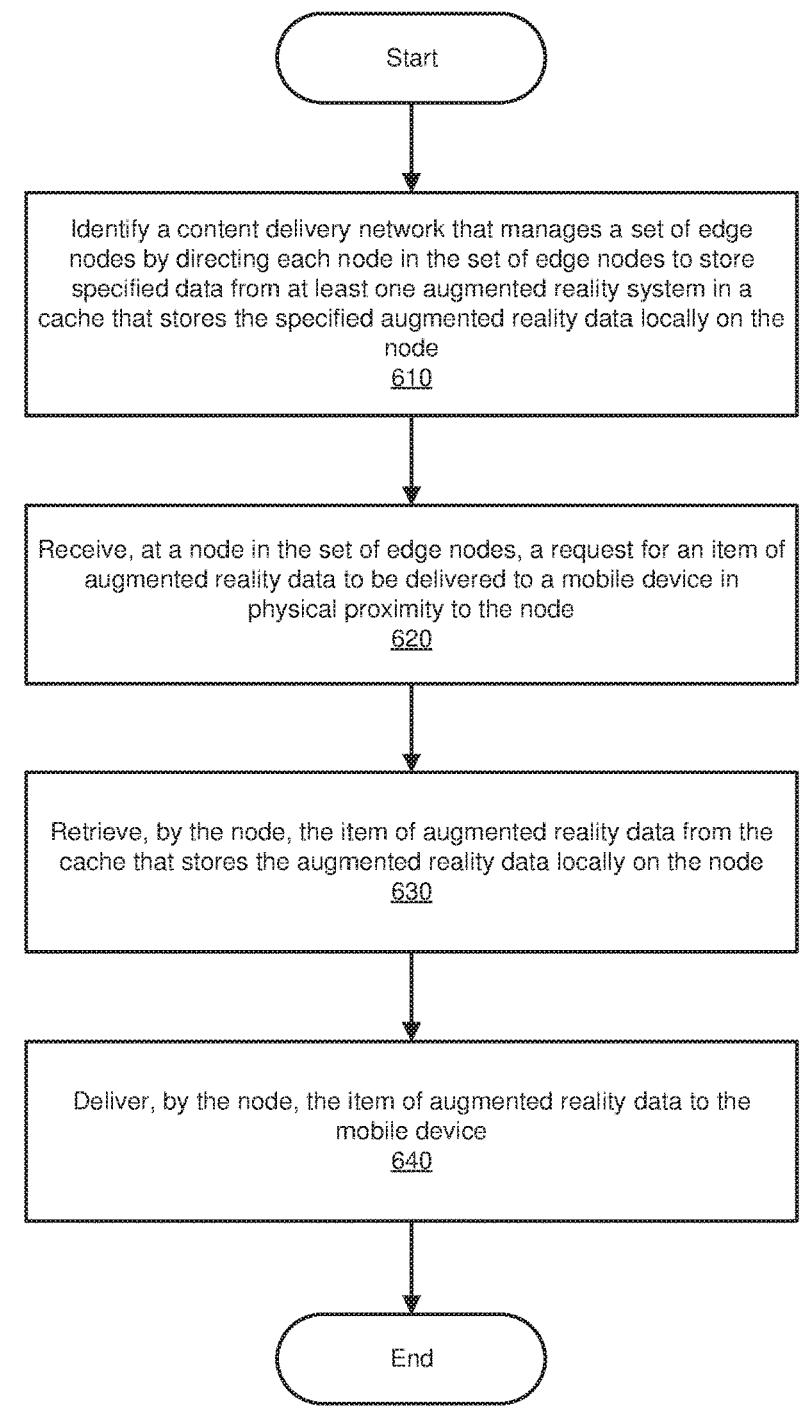
FIG. 6 is a flow diagram of an example method for delivering augmented reality content.

The following will provide, with reference to FIGS. 1 and 6, detailed descriptions of example methods for delivering augmented reality content. Detailed descriptions of example systems for delivering augmented reality content will be described in connection with FIGS. 4, 5, 7, and 8. In addition, detailed descriptions of example nodes and example nodes in context will be provided in connection with FIGS. 2, 3, and 9.

FIG. 1 is a flow diagram of an exemplary computer-implemented method 100 for delivering augmented reality content. The steps shown in FIG. 1 may be performed by any suitable computer-executable code and/or computing system, including the system(s) illustrated in FIGS. 7 and 8. In one example, each of the steps shown in FIG. 1 may represent an algorithm whose structure includes and/or is represented by multiple sub-steps, examples of which will be provided in greater detail below.

As illustrated in FIG. 1, at step 110 one or more of the systems described herein may identify, by a content delivery network, a set of edge nodes that are connected to and managed by the content delivery network and that are geographically distributed in a plurality of physical locations and a set of augmented reality data for an augmented reality system, where different subsets of the set of augmented reality data are designated for use at different locations in the plurality of physical locations.

The term "content delivery network," as used herein, generally refers to any combination of software systems and/or hardware devices that distributes data that is anticipated to be requested across a network (e.g., to reduce costs and/or to improve performance associated with fulfilling requests for the data). In some embodiments, a content delivery network may include a geographically distributed network of data centers and/or proxy servers. In some examples, a content delivery network may include software that determines how to distribute content across the network. In some embodiments, a content delivery network may be operated by an entity that owns the software components of the content delivery network but leases some or all of the hardware components of the content delivery network from a different entity.

The term "edge node," or "node," as used herein, generally refers to a device at the edge of a network that stores data for transmission to end user devices. In some embodiments, a node may have additional functions, such as transmitting wireless signals. In other embodiments, a node may have no additional functions beyond storing data for transmission to end user devices and communicating with a content delivery network about data to send to end user devices. In some embodiments, a node may be composed of a component that transmits wireless signals, a high-capacity cache, a compute module, and/or an application layer. In some embodiments, the application layer may be reconfigurable to enable the node to more efficiently service devices of multiple types. For example, the node may respond differently to a request for augmented reality data from devices with different hardware and/or operating systems in order to send each device data in a manner that will be processed efficiently by the hardware and/or operating system of the device. In some examples, an edge node may be installed outdoors (e.g., as part of and/or alongside urban infrastructure).

Figure 2:
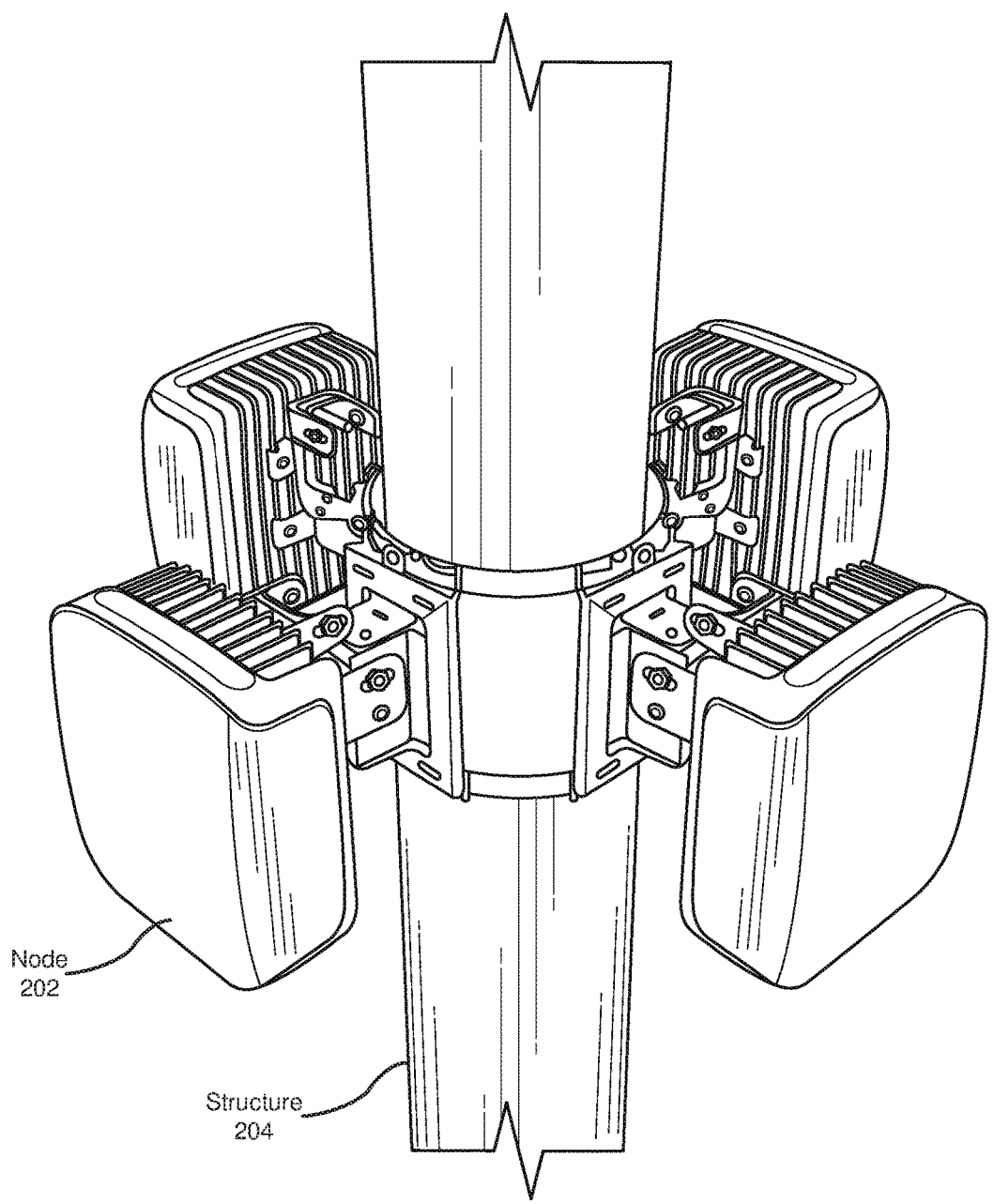
FIG. 2 is an illustration of an example node.

In some examples, a node may be fastened to a pre-existing structure, such as a streetlamp post, telephone pole, power line support, and/or building. For example, as illustrated in FIG. 2, a node 202 may be fastened to a structure 204. In one example, node 202 may broadcast a wireless signal. In other examples, node 202 may be physically connected to one or more other devices that are also attached to structure 204 and that provide wireless network coverage for the physical location serviced by the edge node. For example, node 202 may be part of and/or attached to a TERRAGRAPH node. Additionally or alternatively, node 202 may be part of and/or attached to a device that broadcasts millimeter wave signal, such as a fifth generation mobile network (5G) broadcast node, and/or that operates as a node within a wireless mesh network. In some examples, multiple nodes may be attached to the same structure. Additionally or alternatively, one node may have multiple components in order to improve the node's ability to broadcast in every direction. For example, node 202 may have four components distributed equidistantly around structure 204.

Figure 3:
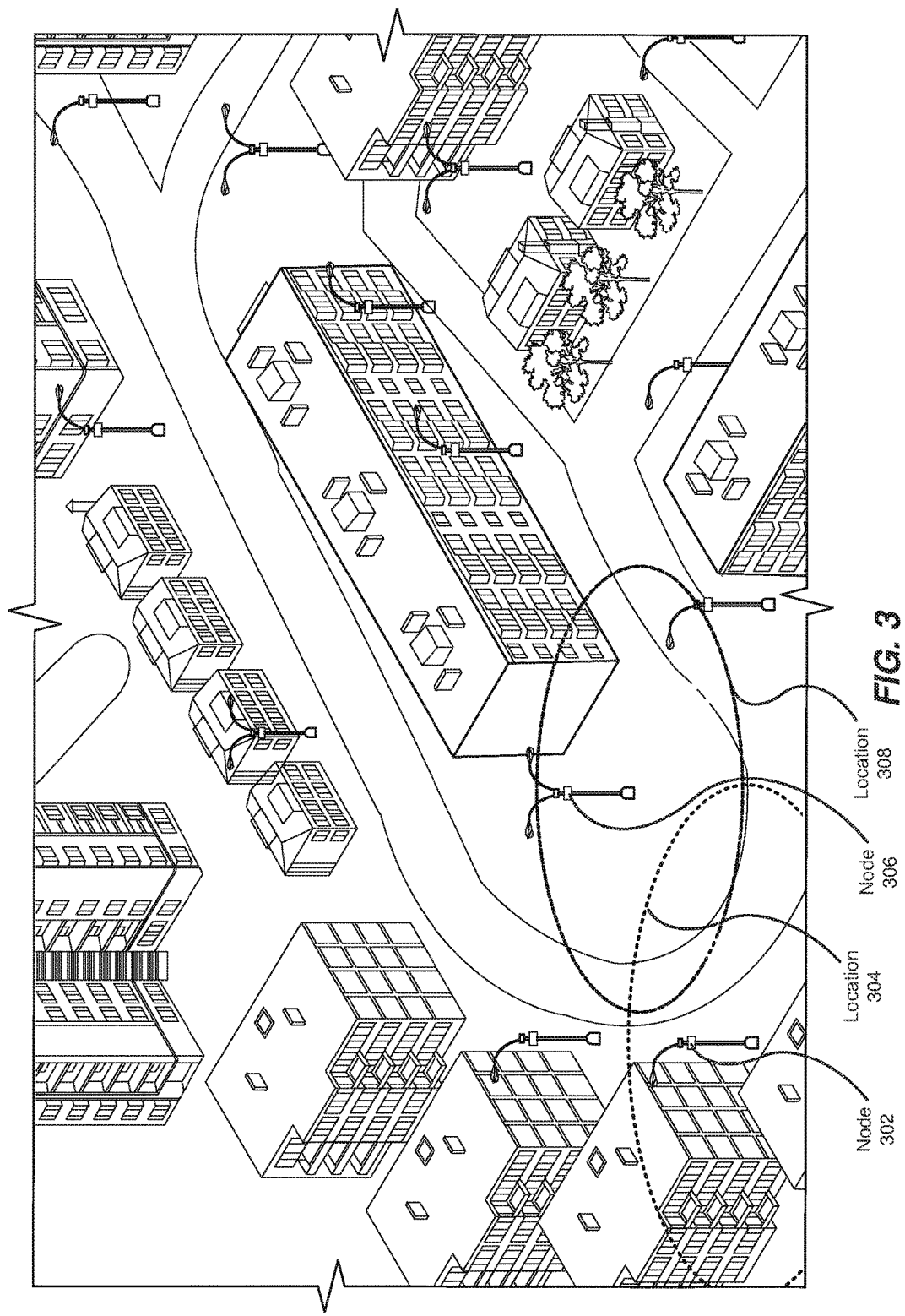
FIG. 3 is a diagram of an example set of nodes in context.

The term "physical location," as used herein, generally refers to a geolocation with an approximate specified radius. For example, a physical location may be an area with a radius of 500 feet, centered around the geolocation of an edge node that services the physical location. In one embodiment, the set of edge nodes may be distributed such that each node is within one thousand feet of at least one additional node within the set of edge nodes. In some examples, a physical location may be a city block. In other examples, a physical location may be smaller than a city block. According to some examples, a physical location may correspond to a coverage area of a wireless networking device (e.g., a wireless networking node within an urban mesh network). In some examples, physical locations may overlap. For example, as illustrated in FIG. 3, a node 302 may service a location 304. In this example, a node 306 may service a location 308 that overlaps with location 304. In some examples, by overlapping in this way, nodes 302 and 306 may ensure a greater consistency of coverage. For example, if a large bus passes in front of node 302, blocking some of the signal sent by node 302 (or a wireless transmission device in communication with node 302) to areas on the far side of the street, node 306 may still provide quality coverage to those areas.

The term "augmented reality system," as used herein, generally refers to any system that overlays data onto real-time real-world images. In some examples, an augmented reality system may include, be part of, and/or be another term for a mixed reality system. In some embodiments, an augmented reality system may insert digital objects into the camera view of a mobile device. For example, a user may hold up their device to a nearby landmark and the device's screen may display not just the landmark but also a virtual object such as an annotation, a person, and/or a monster. In some embodiments, virtual objects in an augmented reality system may be tied to physical locations. For example, any user looking at the same landmark at the same time may see the same virtual object. In some embodiments, an augmented reality system may include multiple campaigns with different sets of objects. For example, every user who is participating in a monster-hunting augmented reality campaign may see the same virtual monster in front of a certain landmark but a user who is participating in a baseball-themed augmented reality campaign may instead see a baseball player in front of that landmark.

The term "augmented reality data," as used herein, generally refers to any data describing virtual objects and/or the location and/or behavior of virtual objects for an augmented reality system. In some examples, an item of augmented reality data may include high-definition visual data for display on the screen of the mobile device, such as a photorealistic image and/or high-definition video. Additionally or alternatively, an item of augmented reality data may include audio, text, tactile information, and/or other data.

The systems described herein may perform step 110 in a variety of ways. In one example, a content delivery network may identify a set of edge nodes that are owned by the same entity that owns the content delivery network. In another example, a content delivery network may identify a set of edge nodes that are owned by a different entity than the entity that owns the content delivery network. For example, an organization may lease and/or pay for the use of a set of edge nodes owned by another organization in order to use the set of edge nodes to deliver data for an augmented reality system. Additionally or alternatively, the owner of the augmented reality system may lease both the hardware components of the content delivery network and the edge nodes from one or more other entities.

In some embodiments, the systems described herein may identify the subsets of the augmented reality data that are designated for use at different locations by receiving information from an administrator about which data is designated for use at which locations. For example, an administrator may designate that specific virtual objects should appear at specific locations during specific times. Additionally or alternatively, the systems described herein may programmatically assign subsets of augmented reality data to specific locations. In one example, the systems described herein may arbitrarily assign specific virtual objects to specific locations. In another example, the systems described herein may determine which virtual objects should be assigned to which locations based on features of the virtual objects and/or locations. For example, the systems described herein may assign virtual objects associated with sports to appear near locations with names like "stadium" and/or "arena" while assigning virtual objects associated with schools to appear near locations with names like "school," "elementary," "university," and/or "college." In some examples, the systems described herein may determine which data is designated for use in which locations based on a combination of human and programmatic input. For example, an administrator may manually designate the location of major virtual objects, such as the boss enemies in a game, while one or more systems described herein may programmatically designate the locations of the rest of the data, such as lower-level enemies. In some examples, procedurally generated augmented reality experiences may use real-world map data to at least partially determine the location of augmented reality objects. For example, certain augmented reality content may be designated for public spaces (rather than private spaces), outdoor spaces (rather than indoor spaces), and/or pedestrian spaces (rather than streets for vehicular traffic).

The set of edge nodes may be physically distributed in a variety of ways. In some examples, the edge nodes may be distributed at a block-level density in several areas of a city but may not cover other areas of the city. In one example, each node may be within a city block of at least one other node, but clusters of nodes may be spaced far apart from other clusters of nodes. In other examples, the edge nodes may be distributed at a block-level density across one or more cities. In some examples, most nodes may be within a city block of at least one other node, but some nodes may be outliers that are not within a city block of any other node. Additionally or alternatively, nodes may be distributed at sparser densities, such as every quarter mile, half mile, mile, or five miles.

In some embodiments, edge nodes may each be physically connected to and/or may be physically part of wireless communication infrastructure. For example, each node may be connected to and/or part of a TERRAGRAPH node that provides wireless Internet connectivity to the physical location serviced by the node. In another example, each node may be connected to and/or part of a 5G node that provides mobile data to the physical location serviced by the node. In some embodiments, there may be complete integration between the wireless communication infrastructure and the nodes and/or content delivery network. In other embodiments, only part of the wireless communication infrastructure may be connected to the nodes and/or content delivery network. For example, a wireless communication infrastructure may cover multiple regions but may only partner with the content delivery network in one region.

Returning to FIG. 1, at step 120, one or more of the systems described herein may direct, by the content delivery network, each edge node in the set of edge nodes to store a specified subset of the set of augmented reality data that is designated for use at a physical location within the plurality of physical locations that is serviced by the edge node.

The systems described herein may perform step 110 in a variety of ways. In one example, the systems described herein may send the specified subset of data directly to the edge node. In another example, the systems described herein may send a fingerprint, signature, and/or other description of the specified subset of data to the edge node and the edge node may initiate a download of the data (e.g., from a data center).

In one embodiment, the content delivery network may direct each edge node in the set of edge nodes to store the specified subset of the set of augmented reality data by identifying a demographic of users that connect to the edge node and selecting the specified subset of the set of augmented reality data based at least in part on the demographic of users that connect to the edge node (and/or to a network node that is proximate to and/or directly connected to the edge node). For example, the content delivery network may use usage statistics, social graph information from one or more social networking platforms, information supplied by users, and/or other information to determine the age, employment status, employment type, race, gender, and/or other characteristics of the users that connect to the edge node.

In some embodiments, the content delivery network may identify demographic information for every user that has connected to the edge node (and/or to a network node that is proximate to and/or directly connected to the edge node) within a predetermined period of time. In other embodiments, the content delivery network may identify demographic information for users that connect to the edge node with a certain frequency, such as every day, five out of every seven days, or ten or more times within a month. In some examples, the content delivery network may attempt to identify users that live and/or work within a certain range of the node and may assign a higher weight to demographic information about those users.

In some examples, the content delivery network may select the specified subset of the set of augmented reality data based at least in part on the demographic of users that connect to the edge node by identifying an augmented reality campaign, determining that the augmented reality campaign is targeted at the demographic of users that connect to the edge node, and selecting the specified subset of the set of augmented reality data that includes data designated for use at the physical location for the augmented reality campaign. In some embodiments, the content delivery network may direct an edge node to prioritize one augmented reality campaign over another because it may not be efficient or possible for the edge node to locally store all of the relevant data for all of the currently active augmented reality campaigns. For example, an augmented reality system may feature two simultaneous augmented reality campaigns, one centered around superheroes and the other centered around a brand of cars. In some examples, the content delivery network may determine that the demographic of users that regularly connect to a certain edge node is significantly more likely to be interested in superheroes than in cars, and may direct that edge node to store data for the augmented reality campaign centered around superheroes locally in the cache and not store data locally for the augmented reality campaign centered around cars.

Figure 4:
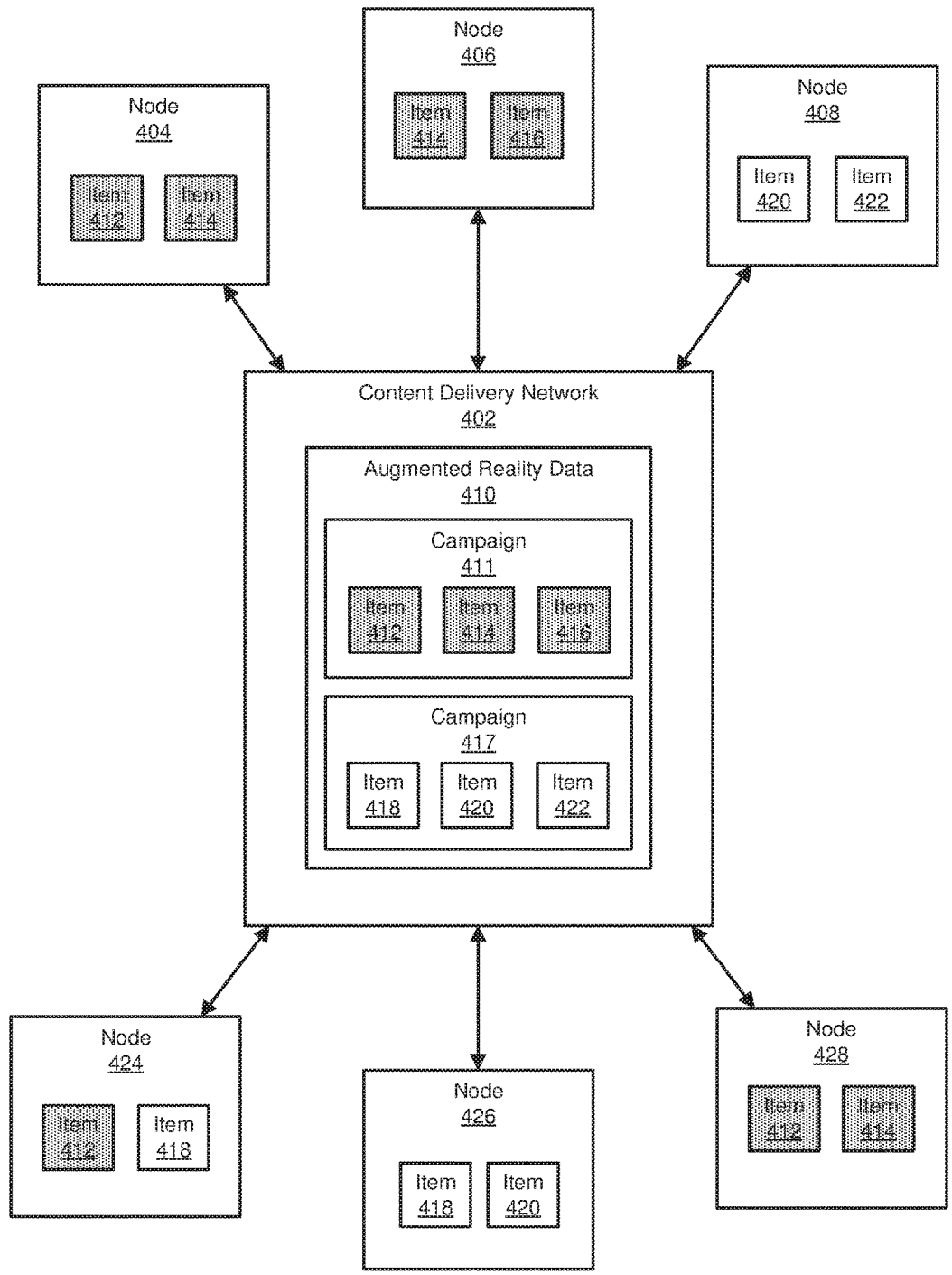
FIG. 4 is a block diagram of an example computing system for delivering augmented reality content.

In some examples, different nodes may store different mixes of data for different augmented reality campaigns. For example, as illustrated in FIG. 4, nodes 404, 406, 408, 424, 426, and/or 428 may connect to a content delivery network 402 that hosts augmented reality data 410. In one example, an augmented reality campaign 411 may include items 412, 414, and/or 416 of augmented reality data and/or an augmented reality campaign 417 may include items 418, 420, and/or 422 of augmented reality data.

In this example, various nodes may have different items of data designated for use at their respective physical locations and/or may store different items of data based on the demographic of users serviced by the node. For example, nodes 404, 406, and/or 428 may primarily service the demographic of users targeted by campaign 411 and may thus store items of data that are part of campaign 411, while nodes 408 and 426 may primarily service the demographic of users targeted by campaign 417. In one example, node 424 may service users that are evenly split between both demographics and may thus store some data for each campaign. In another example, node 424 may only have a small amount of data to store for each campaign and may thus be capable of storing all relevant data for both campaigns, rendering the demographic composition of the users serviced by node 424 less relevant.

In some examples, different nodes that service the same demographic may store different items of data for the same augmented reality campaign. In one embodiment, the content delivery network may direct each edge node to store the specified subset of the set of augmented reality data that is designated for use at the physical location that is serviced by the edge node by correlating a map for the augmented reality system with the physical locations serviced by the edge nodes. In one example, content delivery network 402 may direct node 404 to store item 412 and/or item 414 and node 406 to store item 414 and/or item 416. In this example, item 414 may be data that is relevant to both locations, such as a generic virtual icon, while item 412 may be data that is more relevant to the location serviced by node 404, such as a water-related icon if the location is near a real-world pond, while item 416 may be data that is more relevant to the location serviced by node 406, such as a sports-related icon if the location is near a real-world stadium.

In one embodiment, the content delivery network may direct each edge node to store the specified subset of the set of augmented reality data that is designated for use at the physical location that is serviced by the edge node by applying a machine learning technique to determine a specified subset of augmented reality data that is expected to be requested by users serviced by the edge node. In some examples, the content delivery network may use historical data about the type of content that has been requested by users at the node. For example, the usage pattern of the users serviced by the node may not match the expected usage pattern of the demographic serviced by the node and the content delivery network may use a machine learning technique to analyze the historical usage pattern of the users serviced by the node to predict which content is most likely to be requested by users of the node in the future. Additionally or alternatively, the content delivery network may use a machine learning technique to predict which portion of the physical location serviced by the node is most likely to trigger requests for augmented reality data. For example, the physical location serviced by a node may cover a busy street corner as well as a quiet side street. In this example, virtual objects that appears on the quiet side street but not the busy street corner may not be requested as frequently as virtual objects that appear on the busy street corner.

In some embodiments, the content delivery network may determine the distribution of augmented reality data based at least in part on price constraints. For example, the owner of the content delivery network may be a different entity than the owner of the edge nodes. In some examples, the owner of the edge nodes may calculate prices for hosting and/or delivering various amounts of augmented reality data on various nodes based on the desirability of the locations serviced by the nodes (e.g., a stadium or transit station versus a residential area), the availability of bandwidth on the network that is connected to the nodes, the desirability of the date covered by the augmented reality campaign, and/or other factors. In some examples, the owner of an augmented reality system may choose between different content delivery networks and/or physical edge node infrastructures based on price. In one example, an augmented reality campaign may be available on some portions of a network but not others due to price constraints.

At step 130, one or more of the systems described herein may detect, by the content delivery network, a request from a mobile device for an item of augmented reality data for the augmented reality system.

The term "mobile device," as used herein, generally refers to any device capable of reading computer-executable instructions that is designed to be portable. In some embodiments, a mobile device may include wireless network functionality, a camera, and/or a screen. In some examples, a mobile device may be a mobile phone and/or a tablet. Additional examples of mobile devices may include, without limitation, laptops, tablets, Personal Digital Assistants (PDAs), multimedia players, wearable devices (e.g., smart watches, smart glasses, etc.), smart vehicles, portable gaming consoles, variations or combinations of one or more of the same, and/or any other suitable portable computing device.

The systems described herein may perform step 110 in a variety of ways. In one example, the content delivery network may detect the request from the mobile device for the item of augmented reality data for the augmented reality system by receiving, at a portion of the content delivery network that is hosted on a server, the request from the mobile device. For example, an augmented reality application on the mobile device may send the request to the content delivery network. In some examples, the request may be relayed through a number of devices before arriving at a server that is capable of processing the request.

Additionally or alternatively, the content delivery network may have permissions on devices that relay traffic for the content delivery network that allows components of the content delivery network closer to the edge of the network to inspect network traffic (e.g., by inspecting packets). In some examples, the content delivery network may detect the request by inspecting and/or intercepting a message from the mobile device that includes the request. In these examples, the content delivery network may process the message closer to the edge of the network than in examples where the content delivery network cannot inspect network traffic. In one example, the content delivery network may intercept the request on a device that is in proximity to the proximate node.

In some examples, the content delivery network may reduce the latency of the response to the request by intercepting the request close to the edge of the network, when the message has been relayed through relatively few devices after being sent from the mobile device. For example, as illustrated in FIG. 5, a mobile device 502 may send a request 522 for an item of augmented reality data for an augmented reality system delivered by a content delivery network 520. In some examples, a device 506 near the edge of content delivery network 520 may be the first device that is part of content delivery network 520 to receive request 522. In some embodiments, device 506 may relay request 522 to a device 508 that may then relay request 522 to a device 510, that may in turn relay request 522 to a server 512 that may relay request 522 to a server 514 that may relay request 522 to a server 516. In this embodiment, server 516 may process the request and may, via server 514, server 512, device 510, device 508, and device 506, direct node 504 to deliver the item of augmented reality data to mobile device 502. However, in another embodiment, device 506 may intercept request 522 and, without forwarding the request farther upstream, direct node 504 to deliver the item of augmented reality content to mobile device 502. In this embodiment, the latency of the response to request 522 may be reduced due to the shorter round-trip.

In some examples, the device in closest physical and/or network proximity to the node may not be the device that intercepts the request. For example, device 510 may intercept request 522 after request 522 has passed through device 506 and/or device 508. In some examples, device 510 may then direct node 504, via device 506 and/or device 508, to deliver the augmented reality data to mobile device 502. In this example, even though request 522 passes through several devices, the round-trip length is still reduced compared to an example without interception because request 522 does not travel all the way to server 516.

Returning to FIG. 1, at step 140, one or more of the systems described herein may select, by the content delivery network, a proximate node within the set of edge nodes based at least in part on a proximity of the proximate node to the mobile device.

The systems described herein may perform step 140 in a variety of ways. In some examples, the content delivery network may select the node by selecting the proximate node in response to determining that the proximate node is in closest physical proximity to the mobile device compared to all other nodes within the set of edge nodes that are available to deliver the item of augmented reality data. In some embodiments, the content delivery network may direct the physically closest node to the mobile device to deliver the item of augmented reality data whether or not the item of augmented reality data is currently stored in the local cache on the node. In other embodiments, the content delivery network may direct the physically closest node that currently has the item of augmented reality data currently stored locally in a cache on the node to deliver the item of augmented reality data. Additionally or alternatively, the content delivery network may perform a load balancing operating and may select the closest node that both stores the data and has available resources to deliver the data. In some embodiments, the content delivery network may consider network proximity in place of and/or in addition to physical proximity when selecting a node to direct to deliver the item of augmented reality data.

In some examples, the content delivery network may detect the request by intercepting the request on a device that is in proximity to the proximate node and may then select the proximate node within the set of edge nodes based at least in part on the proximity of the node to the device that intercepted the request. For example, the content delivery network may select the node in closest physical and/or network proximity to the device that intercepted the request, reducing the physical and/or network distance traveled to fulfill the request. In some embodiments, by selecting the node in closest proximity to the device that intercepted the request, the content delivery network may avoid forwarding the request to a portion of the content delivery network hosted on a server. In some example, the content delivery network may shorten the roundtrip of the request and thus reduce the latency of the response by intercepting the request from the mobile device at a device in proximity to the node and then directing the node to deliver the item of augmented reality data to the mobile device.

At step 150, one or more of the systems described herein may direct, by the content delivery network, the proximate node to send the item of augmented reality data to the mobile device.

The systems described herein may perform step 150 in a variety of ways. In one example, the content delivery network may forward the request from the mobile device to the node. In another example, the content delivery network may send a message to the node indicating what item or items of augmented reality data to send to the mobile device.

In some embodiments, the systems described herein may perform steps that take place on a node. FIG. 6 is a flow diagram of an exemplary computer-implemented method 600 for delivering augmented reality content.

As illustrated in FIG. 6, at step 610, one or more of the systems described herein may identify a content delivery network that manages a set of edge nodes by directing each node in the set of edge nodes to store specified data from at least one augmented reality system in a cache that stores the specified augmented reality data locally on the node.

The systems described herein may perform step 610 in a variety of ways. In some embodiments, a node may only ever be managed by a single content delivery network. In other embodiments, a node may be managed by different content delivery networks at different times. For example, a node may be a physical device that is leased by the owners of different content delivery networks and/or the owners of different augmented reality systems at different times. In some embodiments, a node may be managed by multiple content delivery networks simultaneously that each manage a portion of the node. For example, a node may have 60% of the cache space on the node allocated to data for one content delivery network and the remainder of the cache space allocated to data for a different content delivery network.

In some embodiments, nodes may communicate with other nodes to determine what augmented reality data to store. In some examples, a node may intelligently sync with other nearby nodes to avoid duplication of locally stored data, perform load-balancing, and/or perform other functions.

At step 620, one or more of the systems described herein may receive, at a node in the set of edge nodes, a request for an item of augmented reality data to be delivered to a mobile device in physical proximity to the node.

The systems described herein may perform step 620 in a variety of ways. In some embodiments, the node may receive the request from a server that is part of the content delivery network. Additionally or alternatively, the node may receive the request from a device in network proximity to the node. In some embodiments, the device in proximity to the node may monitor network traffic originating from the mobile device and may intercept the request for the item of augmented reality data from the mobile device.

In some examples, the node may receive a request that is forwarded by the content delivery network from the mobile device. In other examples, the node may receive a request that was created by the content delivery network after processing a message from the mobile device.

At step 630, one or more of the systems described herein may retrieve, by the node, the item of augmented reality data from the cache that stores the augmented reality data locally on the node.

The systems described herein may perform step 630 in a variety of ways. In some examples, the retrieval may be a cache hit and the node may retrieve the information directly from the cache. In other examples, the retrieval may be a cache miss. In some examples, retrieving the item of augmented reality data may include determining, by the node, that the item of augmented reality data is not stored in the cache on the node, requesting, by the node, the item of augmented reality data from the content delivery network, receiving, by the node, the item of augmented reality data from the content delivery network, and storing, by the node, the item of augmented reality data in the cache on the node. In other examples, the node may not store the item of augmented reality data in the cache in the event of a cache miss. In one example, the cache may already be full of data that is prioritized over the item of augmented reality data that has just been retrieved.

At step 640, one or more of the systems described herein may deliver, by the node, the item of augmented reality data to the mobile device.

The systems described herein may perform step 640 in a variety of ways. In some examples, the node may deliver the item of augmented reality data in a single message. In other examples, the node may deliver the item of augmented reality data across multiple messages and/or in stages. For example, if the item of augmented reality data is a high-resolution three-dimensional object, the node may first deliver a low-resolution version of the object to be used by the mobile device as a placeholder while the node delivers all of the data necessary to display the high-resolution version of the object.

Figure 7:
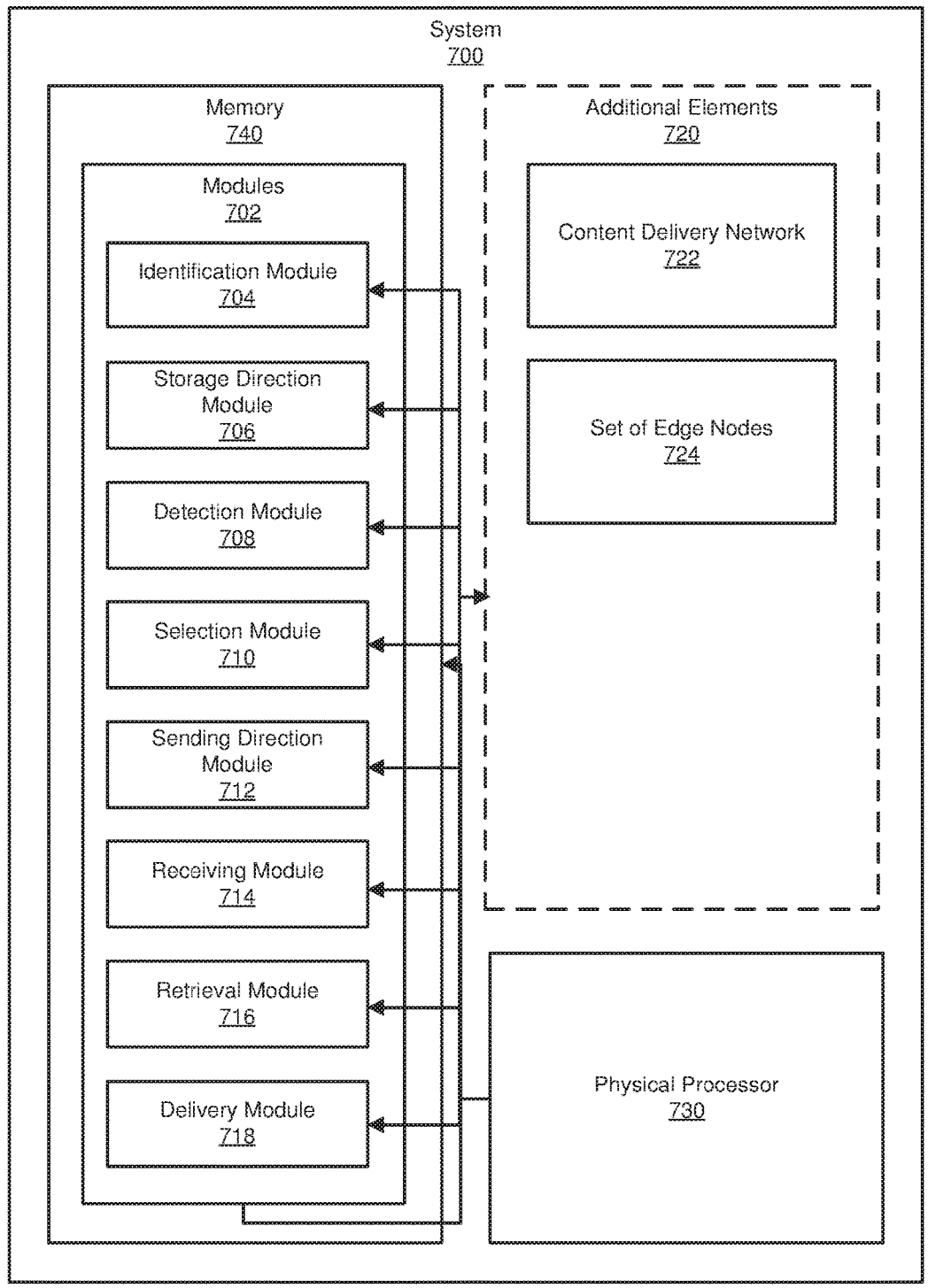
FIG. 7 is a block diagram of an example computing system for delivering augmented reality content.

In some embodiments, the systems described herein may be implemented via one or more modules. For example, FIG. 7 is a block diagram of an example system 700 for delivering augmented reality content. As illustrated in this figure, example system 700 may include one or more modules 702 for performing one or more tasks. For example, and as will be explained in greater detail below, example system 700 may include an identification module 704 that identifies, by a content delivery network, a set of edge nodes that are connected to and managed by the content delivery network and that are geographically distributed in a plurality of physical locations and a set of augmented reality data for an augmented reality system, where different subsets of the set of augmented reality data are designated for use at different locations in the plurality of physical locations.

Example system 700 may additionally include a storage direction module 706 that directs, by the content delivery network, each edge node in the set of edge nodes to store a specified subset of the set of augmented reality data that is designated for use at a physical location within the plurality of physical locations that is serviced by the edge node. Example system 700 may also include a detection module 708 that detects, by the content delivery network, a request from a mobile device for an item of augmented reality data for the augmented reality system. Example system 700 may additionally include a selection module 710 that selects, by the content delivery network, a proximate node within the set of edge nodes based at least in part on a proximity of the proximate node to the mobile device. Example system 700 may also include a sending direction module 712 that directs, by the content delivery network, the proximate node to send the item of augmented reality data to the mobile device. Although illustrated as separate elements, one or more of modules 702 in FIG. 7 may represent portions of a single module or application.

In certain embodiments, one or more of modules 702 in FIG. 7 may represent one or more software applications or programs that, when executed by a computing device, may cause the computing device to perform one or more tasks. For example, and as will be described in greater detail below, one or more of modules 702 may represent modules stored and configured to run on one or more computing devices, such as the devices illustrated in FIG. 8 (e.g., computing device 802 and/or proximate node 806). One or more of modules 702 in FIG. 7 may also represent all or portions of one or more special-purpose computers configured to perform one or more tasks.

As illustrated in FIG. 7, example system 700 may also include one or more memory devices, such as memory 740. Memory 740 generally represents any type or form of volatile or non-volatile storage device or medium capable of storing data and/or computer-readable instructions. In one example, memory 740 may store, load, and/or maintain one or more of modules 702. Examples of memory 740 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 7, example system 700 may also include one or more physical processors, such as physical processor 730. Physical processor 730 generally represents any type or form of hardware-implemented processing unit capable of interpreting and/or executing computer-readable instructions. In one example, physical processor 730 may access and/or modify one or more of modules 702 stored in memory 740. Additionally or alternatively, physical processor 730 may execute one or more of modules 702 to facilitate delivering augmented reality content. Examples of physical processor 730 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 7, example system 700 may also include one or more additional elements 720, such as content delivery network 722 and/or set of edge nodes 724. Content delivery network 722 generally represents any type or form of content delivery network composed of hardware and/or software components. Set of edge nodes 724 generally represents any set of one or more devices capable of storing data to be delivered to end-user devices.

Figure 8:
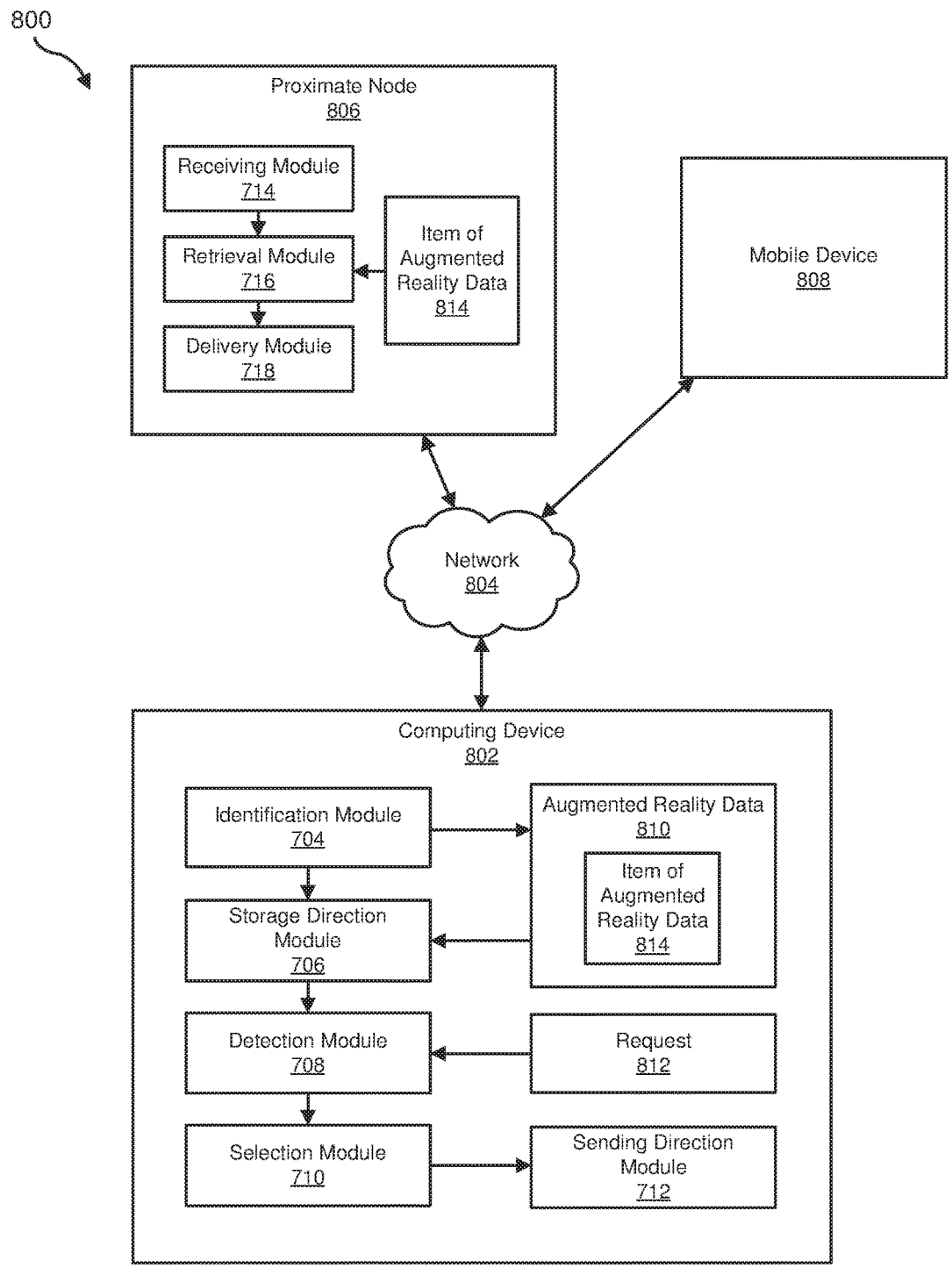
FIG. 8 is a block diagram of an example computing system for delivering augmented reality content.

Example system 700 in FIG. 7 may be implemented in a variety of ways. For example, all or a portion of example system 700 may represent portions of example system 800 in FIG. 8. As shown in FIG. 8, system 800 may include a computing device 802 in communication with a proximate node 806 and/or a mobile device 808 via a network 804. In one example, all or a portion of the functionality of modules 702 may be performed by computing device 802, proximate node 806, and/or any other suitable computing system. As will be described in greater detail below, one or more of modules 702 from FIG. 7 may, when executed by at least one processor of computing device 802 and/or proximate node 806, enable computing device 802 and/or proximate node 806 to deliver augmented reality content.

For example, and as will be described in greater detail below, identification module 704 may identify, by a content delivery network 722, (a) set of edge nodes 724 that are connected to and managed by content delivery network 722 and that are geographically distributed in a plurality of physical locations and (b) a set of augmented reality data 810 for an augmented reality system, where different subsets of the set of augmented reality data 810 are designated for use at different locations in the plurality of physical locations. Storage direction module 706 may direct, by content delivery network 722, each edge node in set of edge nodes 724 to store a specified subset of the set of augmented reality data 810 that is designated for use at a physical location within the plurality of physical locations that is serviced by the edge node. At some later time, detection module 708 may detect, by content delivery network 722, a request 812 from a mobile device 808 for an item of augmented reality data 814 for the augmented reality system. Next, selection module 710 may select, by the content delivery network 722, a proximate node 806 within set of edge nodes 724 based at least in part on a proximity of proximate node 806 to mobile device 808. After proximate node 806 has been selected, sending direction module 712 may direct, by content delivery network 722, proximate node 806 to send item of augmented reality data 814 to mobile device 808.

In some embodiments, a receiving module 714 may receive, at proximate node 806, request 812 for item of augmented reality data 814 to be delivered to mobile device 808. Next, a retrieval module 716 may retrieve item of augmented reality data 814 from a cache that stores the augmented reality data locally on proximate node 806. Finally, a delivery module 718 may deliver item of augmented reality data 814 to mobile device 808.

Computing device 802 generally represents any type or form of computing device capable of reading computer-executable instructions. In one embodiment, computing device 802 may be a data server that is part of a content delivery network. Additional examples of computing device 802 include, without limitation, security servers, application servers, web servers, storage servers, and/or database servers configured to run certain software applications and/or provide various security, web, storage, and/or database services. Although illustrated as a single entity in FIG. 8, computing device 802 may include and/or represent a plurality of computing devices and/or servers that work and/or operate in conjunction with one another.

Network 804 generally represents any medium or architecture capable of facilitating communication or data transfer. In one example, network 804 may facilitate communication between computing device 802 and node 806. In this example, network 804 may facilitate communication or data transfer using wireless and/or wired connections. Examples of network 804 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

In some embodiments, a mobile device may request augmented reality data after encountering an augmented reality trigger. In some examples, the trigger may be a specific image seen by a camera of the device, such as a street sign. In other examples, the trigger may be a geolocation. Additionally or alternatively, a trigger may be a message received by the mobile device, such as a text message, a short message service message, an instant messenger message, and/or any other form of electronic message. For example, as illustrated in FIG. 9, a user 904 carrying a device 902 may enter a geolocation that is a trigger 908 that triggers an augmented reality event involving an object 910. In one example, the systems described herein may determine that node 906 is the closest node to user 904 and the content delivery network may direct node 906 to deliver the data for object 910 to device 902. In some examples, a screen of device 902 may display object 910 overlaid on the background of the physical objects visible to the camera. For example, the screen may show a dinosaur in front of the street, trees, and houses that are actually present.

In some examples, by storing the data for object 910 on node 906 that is close to trigger 908, the systems and methods described herein may enable object 910 to be delivered to device 902 with low latency, causing object 910 to appear on a screen of device 902 after user 904 interacts with trigger 908 with little or no delay. In some examples, causing virtual objects to appear with minimal delay may improve user immersion in an augmented reality system and/or overall user experience.

As explained in connection with methods 100 and 600 above, the systems described herein may efficiently deliver high-definition augmented reality data to mobile devices by storing the data on nodes at or near the edge of the network so that the data has a relatively short distance to travel to reach the mobile device. Because of the hyper-local nature of the demand for augmented reality data, in some examples, the systems described herein may be able to accurately predict which data will be requested near each node and may provision nodes with the data that corresponds to the physical location serviced by the node. In some examples, the type of data requested near a node may be less clear-cut due to multiple augmented reality campaigns running simultaneously that each include data that corresponds to the physical location serviced by the node. In these examples, the systems described herein may use demographic data about the users who regularly connect to the node, historical trends about data usage at the node, and/or machine learning techniques to predict which data is most likely to be requested near the node. By reducing the latency of fulfilling augmented reality data requests, the systems described herein may improve the user experience of users participating in augmented reality systems.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a request to be transformed, transform the request by determining the data being requested, output a result of the transformation to locate the data being requested, use the result of the transformation to retrieve the data being requested, and store the result of the transformation to record the transaction. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying, by a content delivery network:
      a set of edge nodes that are connected to and managed by the content delivery network and that are geographically distributed in a plurality of physical locations; and
      a set of augmented reality data for an augmented reality system;
   designating different subsets of the set of augmented reality data for use at different locations in the plurality of physical locations;
   directing, by the content delivery network, each edge node in the set of edge nodes to store a specified subset of the set of augmented reality data based on the specified subset of the set of augmented reality data being designated for use at a physical location within the plurality of physical locations that is serviced by the edge node;
   detecting, by the content delivery network, a request from a mobile device for an item of augmented reality data for the augmented reality system;

selecting, by the content delivery network, a proximate node within the set of edge nodes based at least in part on a proximity of the proximate node to the mobile device; and directing, by the content delivery network, the proximate node to send the item of augmented reality data to the mobile device.

2. The computer-implemented method of claim 1, wherein directing, by the content delivery network, each edge node in the set of edge nodes to store the specified subset of the set of augmented reality data that is designated for use at the physical location that is serviced by the edge node comprises:

identifying a demographic of users that connect to the edge node; and selecting the specified subset of the set of augmented reality data based at least in part on the demographic of users that connect to the edge node.

3. The computer-implemented method of claim 2, wherein selecting the specified subset of the set of augmented reality data based at least in part on the demographic of users that connect to the edge node comprises:

identifying an augmented reality campaign;

determining that the augmented reality campaign is targeted at the demographic of users that connect to the edge node that services the physical location; and selecting the specified subset of the set of augmented reality data that comprises data designated for use at the physical location for the augmented reality campaign.

4. The computer-implemented method of claim 1, wherein detecting, by the content delivery network, the request from the mobile device for the item of augmented reality data for the augmented reality system comprises receiving, at a portion of the content delivery network that is hosted on a server, the request from the mobile device.

5. The computer-implemented method of claim 1, wherein:

detecting, by the content delivery network, the request from the mobile device for the item of augmented reality data for the augmented reality system comprises intercepting, by a device that is in proximity to the proximate node, the request from the mobile device; and selecting, by the content delivery network, the proximate node within the set of edge nodes based at least in part on the proximity of the proximate node to the mobile device comprises selecting the proximate node in response to the device that is in proximity to the proximate node intercepting the request.

6. The computer-implemented method of claim 5, wherein directing, by the content delivery network, the proximate node to send the item of augmented reality data to the mobile device comprises avoiding forwarding the request to a portion of the content delivery network hosted on a server by directing, by the portion of the content delivery network that is hosted on the device, the proximate node to send the item of augmented reality data to the mobile device.

7. The computer-implemented method of claim 1, wherein selecting, by the content delivery network, the proximate node within the set of edge nodes based at least in part on the proximity of the node to the mobile device comprises selecting the proximate node in response to determining that the proximate node is in closest physical proximity to the mobile device compared to all other nodes within the set of edge nodes that are available to deliver the item of augmented reality data.

8. The computer-implemented method of claim 1, wherein selecting, by the content delivery network, the proximate node within the set of edge nodes based at least in part on the proximity of the proximate node to the mobile device comprises selecting the proximate node based at least in part on network proximity of the proximate node to the mobile device.

9. The computer-implemented method of claim 1, wherein the set of edge nodes that are connected to and managed by the content delivery network and that are geographically distributed in the plurality of physical locations are distributed such that each node within the set of edge nodes is within one thousand feet of at least one additional node within the set of edge nodes.

10. The computer-implemented method of claim 1, wherein the edge node is physically connected to a device that provides wireless network coverage for the physical location serviced by the edge node.

11. The computer-implemented method of claim 1, wherein directing, by the content delivery network, each edge node in the set of edge nodes to store the specified subset of the set of augmented reality data that is designated for use at the physical location within the plurality of physical locations that is serviced by the edge node comprises applying a machine learning technique to determine a specified subset of augmented reality data that is expected to be requested by users serviced by the edge node.

12. The computer-implemented method of claim 1, wherein the item of augmented reality data comprises high-definition visual data for display on a screen of the mobile device.

13. The computer-implemented method of claim 1, wherein directing, by the content delivery network, each edge node in the set of edge nodes to store the specified subset of the set of augmented reality data that is designated for use at the physical location within the plurality of physical locations that is serviced by the edge node comprises correlating a map for the augmented reality system with the plurality of physical locations.

14. A computer-implemented method comprising:

identifying a content delivery network that manages a set of edge nodes by directing each node in the set of edge nodes to store specified data from at least one augmented reality system in a cache that stores the specified augmented reality data locally on the node;

receiving, at a node in the set of edge nodes, a request for an item of augmented reality data to be delivered to a mobile device in physical proximity to the node;

retrieving, by the node, the item of augmented reality data from the cache that stores the augmented reality data locally on the node; and delivering, by the node, the item of augmented reality data to the mobile device.

15. The computer-implemented method of claim 14, wherein receiving, at the node in the set of edge nodes, the request for the item of augmented reality data to be delivered to the mobile device in physical proximity to the node comprises receiving a request from the content delivery network to deliver the item of augmented reality data to the mobile device.

16. The computer-implemented method of claim 14, wherein receiving, at the node in the set of edge nodes, the request for the item of augmented reality data to be delivered to the mobile device in physical proximity to the node comprises:

monitoring, by a device on the content delivery network in proximity to the node, network traffic originating from the mobile device; and intercepting, by the device, the request for the item of augmented reality data from the mobile device.

17. The computer-implemented method of claim 14, wherein retrieving, by the node, the item of augmented reality data from the cache that stores the augmented reality data locally on the node comprises:

determining, by the node, that the item of augmented reality data is not stored in the cache on the node;

requesting, by the node, the item of augmented reality data from the content delivery network;

receiving, by the node, the item of augmented reality data from the content delivery network; and storing, by the node, the item of augmented reality data in the cache on the node.

18. A system comprising:

an identification module, stored in memory, that identifies, by a content delivery network:

a set of edge nodes that are connected to and managed by the content delivery network and that are geographically distributed in a plurality of physical locations; and a set of augmented reality data for an augmented reality system, wherein different subsets of the set of augmented reality data are designated for use at different locations in the plurality of physical locations;

a storage direction module, stored in memory, that:

designates different subsets of the set of augmented reality data for use at different locations in the plurality of physical locations; and directs, by the content delivery network, each edge node in the set of edge nodes to store a specified subset of the set of augmented reality data based on the specified subset of the set of augmented reality data being designated for use at a physical location within the plurality of physical locations that is serviced by the edge node;

a detection module, stored in memory, that detects, by the content delivery network, a request from a mobile device for an item of augmented reality data for the augmented reality system;

a selection module, stored in memory, that selects, by the content delivery network, a proximate node within the set of edge nodes based at least in part on a proximity of the proximate node to the mobile device;

a sending direction module, stored in memory, that directs, by the content delivery network, the proximate node to send the item of augmented reality data to the mobile device;

a receiving module, stored in memory, that receives, at the proximate node, the request for the item of augmented reality data to be delivered to the mobile device in physical proximity to the proximate node;

a retrieval module, stored in memory, that retrieves, by the proximate node, the item of augmented reality data from a cache that stores the augmented reality data locally on the proximate node;

a delivery module, stored in memory, that delivers, by the proximate, node, the item of augmented reality data to the mobile device; and at least one physical processor that executes the identification module, the storage direction module, the detection module, the selection module, the sending direction module, the receiving module, the retrieval module, and the delivery module.

19. The system of claim 18, wherein the storage direction module directs each edge node in the set of edge nodes to store the specified subset of the set of augmented reality data that is designated for use at the physical location that is serviced by the edge node by:

identifying a demographic of users that connect to the edge node; and selecting the specified subset of the set of augmented reality data based at least in part on the demographic of users that connect to the edge node.

20. The system of claim 19, wherein the storage direction module selects the specified subset of the set of augmented reality data based at least in part on the demographic of users that connect to the edge node by:

identifying an augmented reality campaign;

determining that the augmented reality campaign is targeted at the demographic of users that connect to the edge node that services the physical location; and selecting the specified subset of the set of augmented reality data that comprises data designated for use at the physical location for the augmented reality campaign.

* * * * *

UNITED STATES PATENT AND TRADEMARK OFFICE
CERTIFICATE OF CORRECTION

PATENT NO. : 10,685,493 B2
APPLICATION NO. : 15/853846
DATED : June 16, 2020
INVENTOR(S) : Sridhar Rao It is certified that error appears in the above-identified patent and that said Letters Patent is hereby corrected as shown below:

In the Claims

In Column 18, Line 55, Claim 1, delete "designating" and insert -- designating, based on content identifiers associated with each subset of the set of augmented reality data, --, therefor.

In Column 18, Line 56, Claim 1, delete "different" and insert -- specific --, therefor.

In Column 19, Line 3, Claim 1, after "on" insert -- the edge node currently storing the item of augmented reality data and at least in part on --.

In Column 20, Line 47, Claim 14, delete "node;" and insert -- node based at least in part on the specified augmented reality data being designated, based on content identifiers associated with the specified augmented reality data, for use in a physical location served by the node; --, therefor.

In Column 20, Line 48, Claim 14, delete "nodes," and insert -- nodes and based at least in part on the edge node currently storing the item of augmented reality data, --, therefor.

In Column 21, Line 30, Claim 18, delete "designates" and insert -- designates, based on content identifiers associated with each subset of the set of augmented reality data, --, therefor.

In Column 21, Line 31, Claim 18, delete "different" and insert -- specific --, therefor.

In Column 22, Line 1, Claim 18, after "in part on" insert -- the edge node currently storing the item of augmented reality data and at least in part on --.

In Column 22, Line 17 (Approx.), Claim 18, delete "proximate," and insert -- proximate --, therefor.

Signed and Sealed this
Fourth Day of August, 2020

Andrei Iancu
*Director of the United States Patent and Trademark Office*